June 27, 1967  C. P. URHOLT  3,327,744
SAW GUIDE
Filed March 22, 1965  3 Sheets-Sheet 2
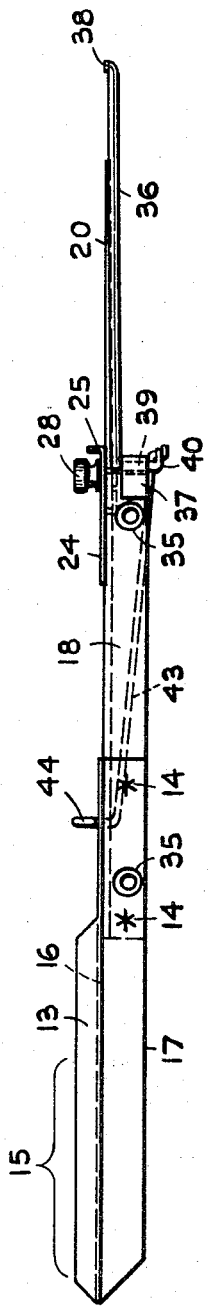
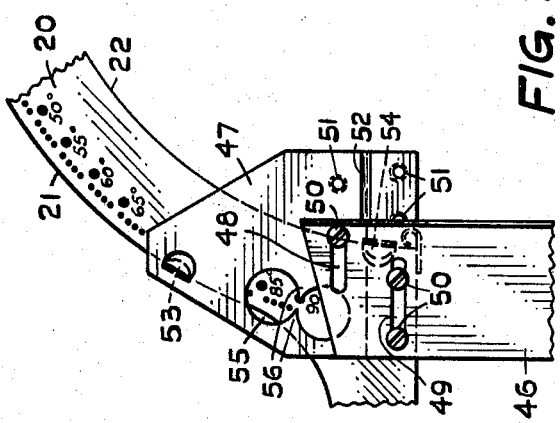
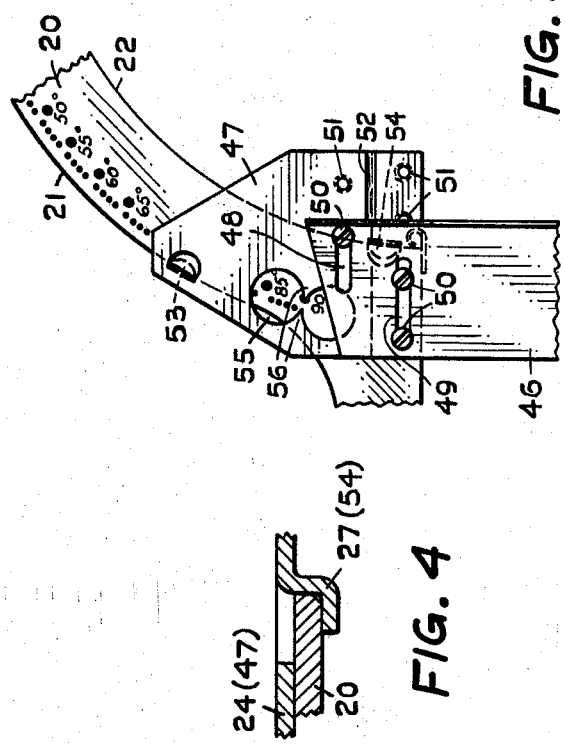
INVENTOR:
Christ Urholt
BY
Fred C. Matheny
ATTORNEY.

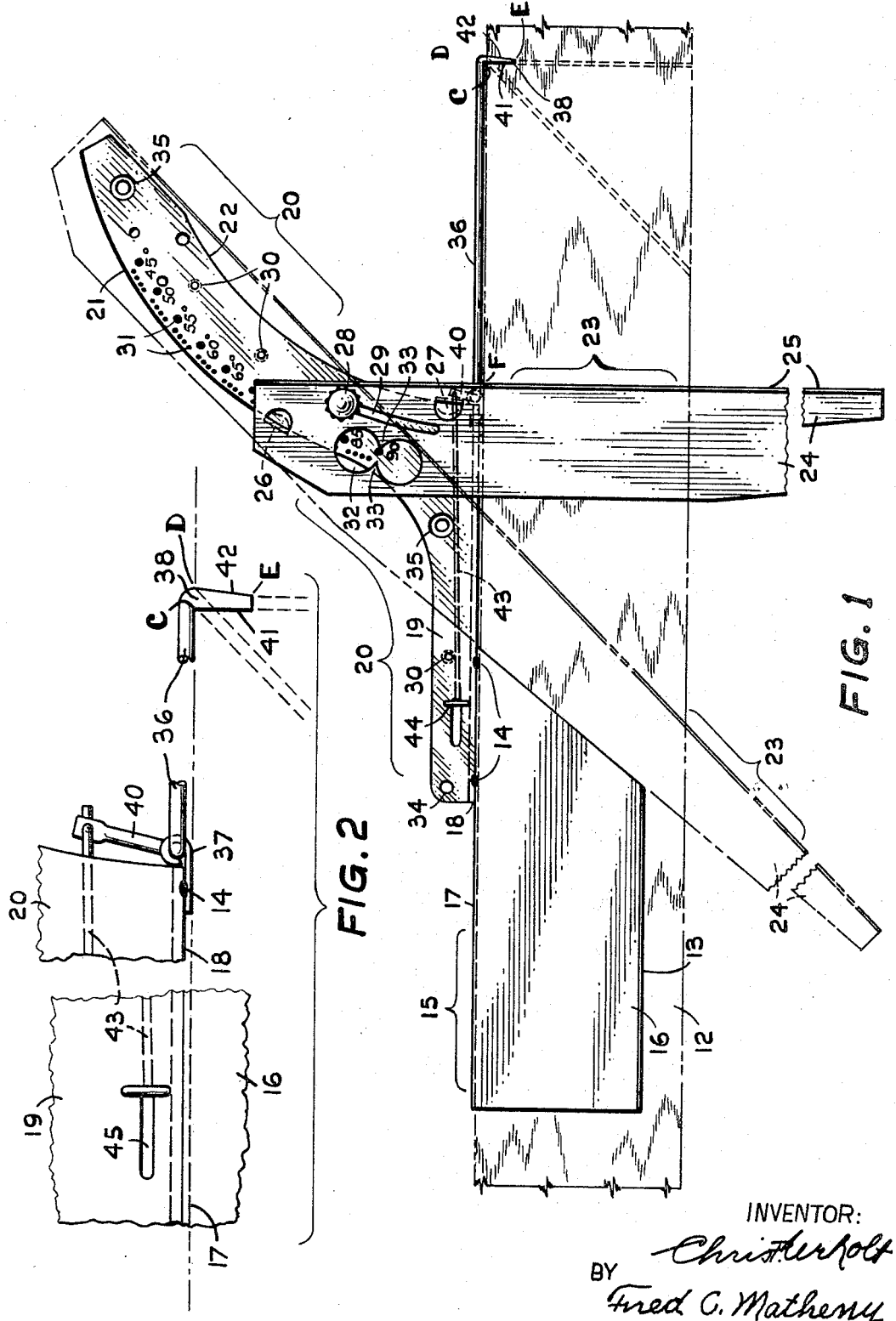

June 27, 1967  C. P. URHOLT  3,327,744
SAW GUIDE
Filed March 22, 1965  3 Sheets-Sheet 3
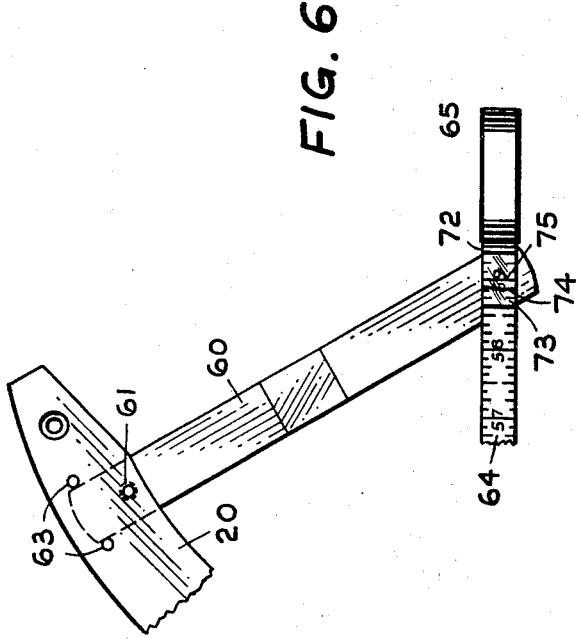
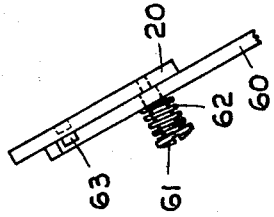
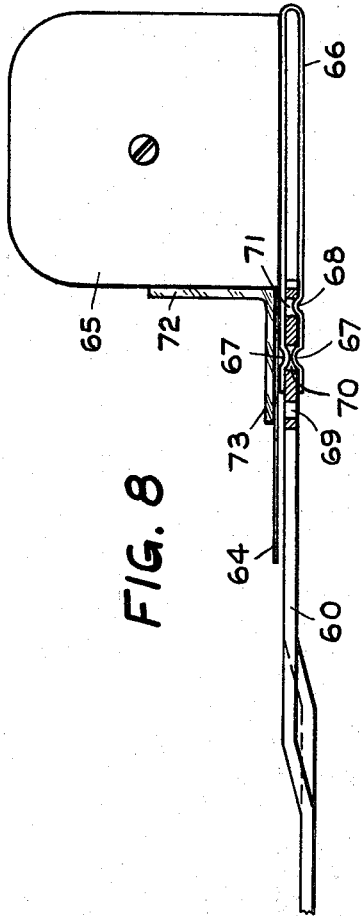
INVENTOR:
Chris Urholt
BY Fred C. Matheny
ATTORNEY.

United States Patent Office 3,327,744
Patented June 27, 1967

3,327,744
SAW GUIDE
Chris P. Urholt, 2822 112th Ave. SE.,
Bellevue, Wash. 98004
Filed Mar. 22, 1965, Ser. No. 441,631
9 Claims. (Cl. 143—167)

ABSTRACT OF THE DISCLOSURE

This saw guide comprises a frame having a part which rests on the material to be sawed and a flange which rests against an edge of the material. A curved track member is rigid with the frame and extends outwardly from one side and beyond one end of the frame. An arm to guide a power saw is supported by the track member and extends across the material and is adjustable to different angles of cut and a folding measuring arm makes possible correct positioning of the saw guide without marking the material.

My invention relates particularly to a saw guide and in its broader aspect to a practical means of locating a plane intersecting another plane at any angle, in such a manner that the point of intersection between the two planes and a line in the intersected plane will fall at a predetermined and directly measurable distance from another point on that line, without any structural supporting members in or near the intersecting plane.

My invention makes it possible, by simple practical means, to orient a plane without any structural supporting members in or near it, intersecting another plane at any angle with the other plane in such spatial relationship that the point of intersection between the two planes and a line in the intersected plane will be at a point on said line determined by a single length measurement from another point on the same line.

My invention is applicable to, and for the purpose of this illustration is herein disclosed as embodied in, a saw guide for a portable power-operated hand saw and a general object of the invention is to provide a simple and efficient saw guide which will enable a user to cut a piece of lumber to a predetermined dimension with only one measurement and without any marking of or layout on the lumber and without having to make any calculations.

Another object is to provide a saw guide which simplifies the operation of and saves time in cutting pieces of material, such as lumber, to accurate dimensions either when the cut is made at right angles to the length of the piece or at an incline other than right angles to the length of said piece.

Another object is to provide a saw guide which is easy to grip and hold in a fixed position on a piece of lumber or like material while sawing the same and one by which a saw is easily guided without requiring the user to expose his eyes to sawdust thrown off by the saw.

Another object is to provide a saw guide that is readily attached to a makeshift stand, such as some pieces of lumber on a couple of saw horses, for rapid cutting of a multiple of pieces of lumber of equal lengths cut at equal angles, or equal lengths cut at different angles, or different lengths cut at the same angle.

In cutting lumber with an electrically driven rotary hand saw, when no saw guide is used, it is common practice to measure the pieces to be cut with a tape or rule, mark the lumber and draw the outline of the desired piece to be cut, and then guide the saw by eye along the marked lines. This involves the use of three tools beside the saw, namely, a tape or rule, a square or protractor and a pencil or other scribing device. These tools must be located, picked up, used and stored again, all of which takes time and requires an orderliness not always inherent in the user, and for easy retrieval, storage space not everywhere available. Guiding the saw by eye involves risk because it necessitates exposing the eyes to flying sawdust, splinters and pieces of wood thrown off by the rapidly rotating saw. The use of my saw guide does away with the need for figuring out the offset for the width of the saw base, marking of and layout on the lumber and guiding of the saw by eye along a line. In so doing it substantially eliminates danger to the eyes of the user and insures steady and accurate guiding of the saw.

Other objects of my invention will be apparent from the following description taken in connection with the accompanying drawings.

FIGURE 1 is a plan view of a saw guide constructed in accordance with my invention showing the same applied to a piece of material to be cut, a guide member being shown by full lines in a position to guide a power saw in making a right angle cut and by phantom lines in a position to guide the saw in making an inclined cut across the piece of material.

FIG. 2 is a fragmentary plan view, on a larger scale than FIG. 1, showing a measuring arm and pivotal mounting means and an actuating device for the same.

FIG. 3 is an edge view of my saw guide with the parts thereof in the positions by which they are shown by full lines in FIG. 1 and with the piece of lumber or like material omitted.

FIG. 4 is an enlarged fragmentary sectional view illustrative of means for attaching a guide plate to a track member by which it is adjustably supported.

FIG. 5 is a fragmentary plan view of a guide member of modified form capable of being adjusted to compensate for saw bases of different widths.

FIG. 6 is a plan view showing a measuring arm of modified form and a measuring tape and tape housing connected therewith.

FIG. 7 is a fragmentary view in elevation showing means for connecting the measuring arm of FIG. 6 with a track plate.

FIG. 8 is a view partly in elevation and partly in section of the measuring arm and tape housing and tape shown in FIG. 6.

Like reference numerals refer to like parts throughout the several views.

The saw guide shown in FIGS. 1 to 4 comprises a support member 15 of thin, strong sheet metal composed of a normally horizontal web portion 16 adapted to rest on the top surface of a piece of material 12, such as lumber, to be sawed and having two flanges 13 and 17 extending perpendicularly in opposite directions from its respective lateral edges. The flange 13 on the rear edge of the web portion 16, that is the edge normally nearest the user, extends upwardly and forms a convenient grip flange or handhold. The flange 17 on the forward edge extends downwardly and serves as a positioning flange and is adapted to be held firmly against an edge of the piece of material 12. The normally horizontal part 16 is of substantial width and this positions the flange 13 well toward the edge of the lumber 12 nearest the user and makes it easier to hold the saw guide in place on a wide piece of lumber by hooking the left thumb over the nearest edge of the lumber and engaging the ends of the fingers over the grip flange 13.

A curved track plate 20 has a base portion composed of a horizontal flange 19 and a vertical flange 18. The vertical flange 18 is secured, as by rivets or spot welds 14 to the downwardly extending positioning flange 17 of the support member 15. The track plate 20 is preferably flat and lies in the same plane as the horizontal flange 19 and said track plate 20 extends longitudinally beyond the adjacent end of the support member 15 and curves transversely away from the plane of the positioning flange 17 of said support member 15.

The track plate 20 has two equidistantly spaced apart arcuate edge portions 21 and 22 which serve as tracks and have a common center located at point C, FIG. 1, as hereinafter more fully explained.

A guide member, indicated generally by numeral 23, is formed of thin but strong sheet metal and comprises a horizontal flange 24 and an upwardly extending vertical guide flange 25. The horizontal flange 24 rests on the track plate 20 and is provided with two similar, downwardly extending, punched out, hook shaped lugs 26 and 27, one of which is shown in FIG. 4. The hook shaped lugs 26 and 27, or other suitable fasteners, hook under and engage with and are adapted to slide along the respective curved edge portions 21 and 22 of the track plate 20 and they cooperate in adjustably securing the guide member 23 to the track plate 20.

The lugs 26 and 27, or other suitable fasteners, will hold the guide member 23 when pressure to the left is applied in stroking a saw against the flange 25. Since there will ordinarily not be any pressure to the right applied against the guide member 23 to lugs 26 and 27 will operate satisfactorily and efficiently in holding the guide member 23 in any set position and will leave the same quickly and easily adjustable making the saw guide particularly useful in cutting pieces at various angles where an adjustment of the guide member 23 may be required for each piece cut. However, for optional use, particularly when a plurality of duplicate pieces are to be cut, I provide means for positively locking the guide member 23 in different positions. This locking means comprises a clamp screw 28 which extends through a curved slot 29 in the horizontal flange 24 of the guide member 23 and is threaded into the track plate 20. The curved slot 29 is of limited length and this limits the angular adjustment of the guide member 23 for each position of the clamp screws 28. However, preferably three spaced apart threaded holes 30, two of which are shown, are provided to receive the clamp screw 28 and this takes care of further angular adjustment of said guide member 23. A fourth threaded hole 30 is provided in flange 19 for storage of the clamp screw 28 when it is not in use.

Suitable graduations 31, preferably in degrees, are provided on the track plate 20 to facilitate setting the guide member 23 at various desired angles. The graduations 31 can be read through a figure eight shaped opening 32 in the flange 24. Reference points 33 are formed at the locations where the cusps of the figure eight shaped opening project and the graduations can be read relative to these points 33.

At least one straight hole 34 and preferably four countersunk holes 35 are provided in the saw guide to facilitate securing it to a jig or like support, not shown. The straight hole 34, shown at the left in FIG. 1, is adapted to receive a screw or double head nail. The countersunk holes, two of which are shown in FIG. 1 in parts 19 and 20 and two of which are shown in FIG. 3 in flanges 17 and 18, are adapted to receive screws of countersunk head type. Mounting the saw guide on a fixed support facilitates cutting a plurality of duplicate pieces.

A measuring arm 36 is pivotally mounted by a bearing member 37 on the end of the flange 18 shown at the right in FIGS. 1–3 and in a position where it lies against the edge of the piece of lumber 12 to which the saw guide is applied. The outer end of said measuring arm 36 carries a transversely extending pointer 38. The arm 36 is made of spring steel thus allowing the pointer 38 to lie on the top surface of a piece of lumber 12 when the measuring arm 36 lies alongside of said piece. This allows the measuring arm 36 to swing away from the lumber and under the track plate 20 when the saw is being used. The pointer 38 marks the position where a saw will cut the piece of lumber 12. The tip end E of the pointer 38 is of a width equal to the width of cut of the saw to be used and measurements are made to the respective faces 41 and 42 of said pointer, depending on which end of the piece of lumber 12 the measurement is made from. Since the center of curvature of the track members 21 and 22 is at point C and the interrelated dimensions of the complete saw guide so designed the guide member 23 will always be positioned to guide the left edge of the saw through the point C, both for ninety degree cuts and for cuts at other than ninety degrees.

The pivoted end portion of the measuring arm 36 is bent to form an upright bearing part 39 and a short transverse lever arm 40. A measuring arm positioning rod 43 is pivotally connected with the outer end of the short lever arm 40 and lies under the horizontal flange 19. An end portion 44 of the positioning rod 43 extends upwardly through a longitudinal slot 45 in the flange 19 and can be conveniently manipulated to swingingly retract the measuring arm 36 clear of the saw before a cut is made.

In the use of the saw guide shown in FIGS. 1 to 4, if a piece of predetermined length and with a square end is to be cut, the saw guide, with guide member 23 set at right angles to the positioning flange 17, is applied as shown in FIG. 1 to the piece 12 with the measuring arm 36 extending along and parallel to the edge of said piece 12 and the pointer 38 resting on the top surface of said piece 12. If the piece to be cut is to be measured from the left end of said piece 12, the operator, by using a tape or like measuring device and adjusting the saw guide longitudinally along the piece 12 while holding the positioning flange 17 against the edge of said piece 12, positions the saw guide so that the inner face 41 of the pointer 38 is at exactly the predetermined distance from the end of the piece 12 to his left. Then when the frame or base of the rotating saw is placed against the flange 25 and the saw moved across the piece 12 it will cut to the precise length measured. Thus time is saved because only one measurement of and no marking and layout on the lumber is required and no figuring is needed to arrive at the measurement. The curvature and positioning of the tracks 21 and 22 and the positioning of the track engaging members 26 and 27 are such that for all adjustments of the guide member 24 between the right angle position shown by full lines in FIG. 1, and the inclined position shown by phantom lines a perpendicular to the outer face of the flange 25 of said guide member 24 will almays maintain the same distance as from point F to point C, said distance being coincident with the width of the base on that particular saw for which the saw guide is adapted.

If a piece of predetermined length is to be cut from the end of the piece of lumber 12 at the operator's right the measurement is taken from the right end of said piece 12 and the saw guide adjusted so as to position a point E at the tip of the pointer 38 and on the face 42 of said pointer at a distance exactly equal to the length of the piece to be cut. Then if the saw is stroked with the saw base held against the guide flange 25 it will cut a piece of the correct length.

The method of use is substantially the same in making an inclined cut at any angle between ninety and forty-five degrees. The guide member 23 is set to the desired angle and, if the maximum length of the piece to be cut is to be measured from the left end of the stock piece 12, the saw guide is adjusted to a position in which the side 41 of the pointer 38 marks the desired length of the piece to be cut. If the measurement for a desired piece with an inclined end is to be made from the right end of the stock piece 12 and the length of the desired piece, measured along its shorter edge is known, then the saw guide is adjusted along the stock piece 12 to a position in which some point on the face 42, as explained hereinafter, is at the correct distance from the right end of said stock piece 12, the measuring arm 36 is swingingly moved out of the way of the saw and the cut is made.

Preferably the width of the tip E of the pointer 38 is equal to the width of the saw cut and the incline of the face 42 so designed that the point D will be accurate for a measurement from the right when the angle of cut is forty-five degrees. For cutting at angles between ninety and forty-five degrees no error in positioning the saw guide will be introduced since the user can interpolate and measure to a place on the face 42 of the pointer 38 that gives correct compensation at any angle.

FIG. 5 illustrates a modified form of my invention in which adjustment can be made to adapt the saw guide for use with power saws having frames or bases of different widths and which offset the saws different distances from the guide member. In said FIG. 5 the track member 20 is the same as the similarly numbered part in FIGS. 1 to 4 but the guide member comprises at least two parts 46 and 47 which are transversely adjustable relative to each other. The part 46 is of angle shaped cross section similar to previously described guide member 23. The horizontal flange of the inner end portion of said part 46 is provided with, preferably two, spaced apart transverse slots 48 and 49 for the reception of screws 50 by which it is secured to the plate part 47. Said plate part 47 is provided with a plurality of suitably spaced apart threaded holes 51 to receive the screws 50 and provide maximum adjustment. Preferably transverse interfitting groove and rib means 52 is provided on and in the contacting surfaces of the parts 46 and 47 to insure accurate alignment of these parts whenever they are clamped together by the screws 50. For instance 52 may indicate a groove in plate 47 to receive a rib of suitable mating shape on the adjacent surface of the guide member 46.

Plate 47 is provided with suitable fasteners, such as punched out hook shaped lugs 53 and 54 corresponding to the lugs 26 and 27 of FIGS. 1 to 4, which adjustably mount the plate 47 on the track plate 20. A figure eight shaped hole 55 in the plate 47 has points 56 and which correspond to hole 32 and points 33 of FIG. 1. Plate 47 can be provided with a slot and locking screw similar to the slot 29 and locking screw 28 of FIG. 1 if desired.

FIGS. 6, 7 and 8 disclose measuring means of modified form which can be embodied in my saw guide in place of the previously described parts 36 to 45 inclusive to enable a user, directly, with only one measurement, and without marking or computation to cut a piece of lumber of predetermined accurately dimensioned length, either at right angles or at an incline to the length of the stock piece from which it is cut, and measured from either end of the stock piece. This measuring means comprises an arm 60 pivotally attached by suitable means, herein illustrated as a shoulder screw 61, to a curved track plate, such as previously described track plate 20. A compression spring 62 yieldingly holds the arm 60 against the track plate 20 and at the same time permits enough movement of the outer end part of said arm 60 away from the track plate 20 so that said outer end part will clear either one of two spaced apart positioning pins 63 and allow said arm 60 to be swingingly moved out of the way of a saw. The pins 63 are rigid with the track plate 20 and accurately position the arm 60 when it is between them. The point where the arm 60 is attached to the track plate 20 is immaterial and said arm 60 may, if so desired, be attached at the location where measuring arm 36, FIG. 1, is attached and by virtually similar means.

A conventional spring retracted tape 64 in a housing 65 is provided for use with the arm 60 in making measurements. The base of the tape housing 65 has a U-shaped spring clip 66 rigidly attached to it. An open-end part of the spring clip 66 projects beyond the tape housing 65 and is adapted to be detachably engaged with the measuring arm 60. The clip 66 is provided at two spaced apart locations with transversely displaced detent members 67 and 68 which can be formed by punching. The terminal portion of the arm 60 is provided with three spaced apart perforations 69, 70 and 71 wherein the detent members 67 and 68 can seat. Preferably two of the detent members 67 are positioned in opposed relation and are adapted to seat in the medial perforation 70 so that they cooperate in forming a pivot about which the tape 64 and housing 65 can move pivotally relative to the arm 60. At least one hundred eighty degrees pivotal movement of the tape 64 and housing 65 is provided thus making it possible to measure in either direction, that is either right or left from the arm 60. The detent member 68 helps in positioning and holding the tape 64 by dropping into either of the perforations 69 or 71 with which it registers. An angle shaped member 72 of transparent material, such as transparent plastic, is secured to the edge portion of the tape housing 65 from which the tape projects. The base flange 73 of the member 72 has two marks 74 and 75 thereon to which measurements can be made. The tape 64 lies closely under the flange 73 and is visible through said flange 73.

The marks 74 and 75 correspond to the pointer 38 of FIGS. 1 to 4 insofar as measurements are concerned. That is the mark 75 is at right angles to the length of the tape 64 and corresponds to the pointer face 41. The mark 74 is inclined relative to the mark 75 and corresponds to the pointer face 42 and is used when the tape 64 and housing 65 are rotated for making measurements from the right. The distance between the marks 74 and 75 at the ends where said marks are closest together is equal to the width of the saw cut. The axis of the pivot formed by the two detent members 67 engaged within the perforation 71 coincides with the mark 75 which is at right angles to the tape and the tape can be turned end for end on this axis. The two marks 75 and 74 are used in the same manner as the two faces 41 and 42 respecttively of the pointer 38 in properly positioning the saw guide relative to the lumber to be sawed.

The foregoing description and accompanying drawings clearly disclose preferred embodiments of my invention but it will be understood that these disclosures are merely illustrative and that changes may be made within the scope of the following claims.

I claim:

1. In a saw guide for application to a piece of material to be cut, a support member comprising a relatively wide normally horizontal part adapted to rest on the piece of material; a downwardly extending positioning flange on the forward edge of said normally horizontal part; an upwardly extending grip flange on the rear edge of said normally horizontal part, said grip flange forming a convenient hand hold by which said positioning flange can be held firmly against an edge of the piece to be cut; and a guide member connected with and supported by said support member and adapted to extend across the piece of material on which the support member rests.

2. The apparatus as claimed in claim 1 in which the guide member is connected with the support member by adjustable means, whereby the angle between said guide member and the positioning flange of said support member can be varied.

3. In a saw guide for application to a piece of material to be cut, a support member comprising a normally horizontal part adapted to rest on the piece of material and having on its forward edge a downwardly extending positioning flange adapted to rest against an edge of the piece of material; a curved track member rigid with said support member and extending longitudinally and transversely from an end of said support member substantially in the plane of the normally horizontal part of said support member; and a guide member movably supported by said curved track member for angular adjustment relative to the plane of the positioning flange of said support member.

4. The apparatus as claimed in claim 3 in which a measuring arm is pivotally supported from said support member and extends beyond the guide member and lies substantially in the plane of said positioning flange when in a measuring position.

5. The apparatus as claimed in claim 1 in which a tape supporting arm is pivotally supported from said support member; and in which a conventional measuring tape and tape housing are carried by the outer end portion of said tape supporting arm in a convenient location for direct measurement from an end of said piece of material to the location of a saw cut.

6. A saw guide for application to a piece of material to be cut comprising a support member formed of a normally horizontal part adapted to rest on the piece of material, said horizontal part having on its forward edge a downwardly extending positioning flange adapted to rest against an edge of the piece of material; a track plate rigid with said support member and extending longitudinally beyond the adjacent end of said support member and positioned substantially in the plane of the horizontal part of said support member and curving transversely away from the plane of said positioning flange; a guide member; and means supporting said guide member from said track plate for angular movement about an axis which is fixed relative to said support member and lies in the plane of the inside surface of said positioning flange.

7. The apparatus as claimed in claim 6 in which the track plate has two equidistantly spaced apart arcuate edge portions serving as track; and the guide member has track engaging parts normally engaged with said tracks supporting said guide member and movable along said tracks in angularly adjusting said guide member.

8. The apparatus as claimed in claim 6 in which the guide member is formed of a mounting part having means capable of movably and adjustably engaging said track plate; and a guide part transversely adjustably attached to said mounting part, whereby said guide part may be adjusted relative to said mounting part to compensate for motor saw bases of different widths.

9. The apparatus as claimed in claim 6 in which a measuring arm is pivotally supported from said track plate and extends longitudinally beyond the part of the track plate with which the support member is connected and lies in the plane of said positioning flange and against an edge of the material when in a measuring position and in which the outer end portion of said measuring arm carries a transversely extending slightly convergent pointer adapted to overlie the material being measured, the tip of said pointer being of a width equal to the width of a saw cut to be made, said pointer having an inner face perpendicular to said arm and an outer face which, considered from the arm outwardly toward the pointer tip, converges slightly relative to said inner face,, the convergence of said outer face relative to said inner face facilitating measurements for saw cuts made at other than right angles to the length of the material.

References Cited

UNITED STATES PATENTS

| | | |
|---|---|---|
| 2,906,303 | 9/1959 | Abel. |
| 3,009,491 | 11/1961 | Josephs. |
| 3,171,451 | 3/1965 | Wilson. |
| 3,263,714 | 8/1966 | Martinson. |

WILLIAM W. DYER, JR., *Primary Examiner.*

W. D. BRAY, *Examiner.*